United States Patent
DeLuca et al.

(10) Patent No.: US 9,942,234 B2
(45) Date of Patent: *Apr. 10, 2018

(54) COGNITIVE PASSWORD ENTRY SYSTEM

(71) Applicant: International Business Machines Corporation, Armonk, NY (US)

(72) Inventors: Lisa Seacat DeLuca, Baltimore, MD (US); James R. Kozloski, New Fairfield, CT (US); Boaz Mizrachi, Haifa (IL); Clifford A. Pickover, Yorktown Heights, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 106 days.

This patent is subject to a terminal disclaimer.

(21) Appl. No.: 14/953,654

(22) Filed: Nov. 30, 2015

(65) Prior Publication Data

US 2017/0093841 A1    Mar. 30, 2017

Related U.S. Application Data

(63) Continuation of application No. 14/868,582, filed on Sep. 29, 2015.

(51) Int. Cl.
*H04L 29/06* (2006.01)
*G06F 21/45* (2013.01)

(52) U.S. Cl.
CPC .............. *H04L 63/10* (2013.01); *G06F 21/45* (2013.01); *H04L 63/083* (2013.01); *H04L 63/20* (2013.01)

(58) Field of Classification Search
CPC ....... H04L 63/10; H04L 63/20; H04L 63/083; G06F 21/45
See application file for complete search history.

(56) References Cited

U.S. PATENT DOCUMENTS 5,425,102 A * 6/1995 Moy ................ G06F 21/31 713/165
6,732,278 B2 * 5/2004 Baird, III .......... H04L 63/083 713/182

(Continued)

OTHER PUBLICATIONS

List of IBM Patents or Patent Applications Treated as Related, Jan. 14, 2016, 2 pages.

(Continued)

*Primary Examiner* — Hadi Armouche
*Assistant Examiner* — Cheng-Feng Huang
(74) *Attorney, Agent, or Firm* — Cantor Colburn LLP; Yeen Tham (57) ABSTRACT

An aspect includes a cognitive password entry system. A processor detects a login attempt targeting a website for a user identifier having a previously stored instance of a password associated with the user identifier. A number of login attempts is monitored since the password was manually entered at the website. The processor determines whether a prompting period has been reached based on the number of login attempts meeting a prompting period threshold. The stored instance of the password is used as an entered password for the login attempt based on determining that the prompting period has not been reached. A cognitive aid prompt is output based on determining that the prompting period has been reached.

9 Claims, 7 Drawing Sheets

(56) References Cited

U.S. PATENT DOCUMENTS

| | | | |
|---|---|---|---|
| 7,644,860 B2* | 1/2010 | Matsushita | G06F 21/31 235/380 |
| 2003/0130957 A1* | 7/2003 | Best | G06F 21/41 705/72 |
| 2009/0046858 A1* | 2/2009 | Iyer, Sr. | G06F 21/85 380/259 |
| 2009/0228978 A1* | 9/2009 | Cooley | G06F 21/45 726/19 |
| 2013/0036154 A1* | 2/2013 | Chhaparia | G06F 17/30867 709/202 |
| 2014/0157390 A1* | 6/2014 | Lurey | G06F 21/123 726/7 |
| 2016/0226853 A1* | 8/2016 | Wall | H04L 63/083 |

OTHER PUBLICATIONS

U.S. Appl. No. 14/868,582, filed Sep. 29, 2015, Entitled: Cognitive Password Entry System, First Named Inventor: Lisa Seacat DeLuca.

* cited by examiner

COGNITIVE PASSWORD ENTRY SYSTEM

DOMESTIC PRIORITY

This application is a continuation of U.S. patent application Ser. No. 14/868,582, filed Sep. 29, 2015, the disclosure of which is incorporated by reference herein in its entirety.

BACKGROUND

The present invention relates to computer systems, and more specifically, to a cognitive password entry system.

In existing password entry systems, there is only a binary choice of allowing passwords to be saved or not allowing passwords to be saved. Once a password is saved, password entry systems typically auto-fill the password upon encountering a login attempt at a website associated with the saved password. Passwords are typically stored locally to a device; however, if the user attempts to access the same website from a different device that does not have access to the stored password, the user must recall the password and manually enter it. If the user has not recently or frequently entered the password, the user may have forgotten the password and be forced to reset the password for accessing the website, which can also lead to problems on other devices where the previous version of the password is still stored.

SUMMARY

According to embodiments of the present invention, a method is provided for cognitive password entry. A processor detects a login attempt targeting a website for a user identifier having a previously stored instance of a password associated with the user identifier. A number of login attempts is monitored since the password was manually entered at the website. The processor determines whether a prompting period has been reached based on the number of login attempts meeting a prompting period threshold. The stored instance of the password is used as an entered password for the login attempt based on determining that the prompting period has not been reached. A cognitive aid prompt is output based on determining that the prompting period has been reached.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments described herein are directed to a password entry system that facilitates password use and memorization in an environment in which systems (e.g., systems accessed with Web pages) may "remember" a password on one device but not on another device, thus sometimes causing users to forget passwords when attempting access from various personal devices. Embodiments provide a cognitive aid so that a user need not go through a password recovery process when using multiple devices or in other scenarios. A password-entry system can store a password and present cognitive aid prompts at a designated rate (e.g., rate R) for the password, even if the password is remembered by the user. As one example, a user may be required to enter the password every third time (even though the system has been asked to store the password) so as to assist in recall of the password by the user over an extended period of time.

Embodiments provide an option to save a password but generate a prompt to reenter the password at a particular rate so that, for example, on the fifth time accessing the website there will be a request to manually enter the password even though an instance of the password has been stored for accessing the website. The prompt (referred to as a cognitive aid prompt) serves as a reminder and may make it easier for the user to remember the password while still saving it for faster entry into the website.

Another example of cognitive aid prompts that encourage recall through repeated exposure to associative cues for a given password may involve the use of correlated contexts. Currently, as a security feature, many websites present a picture, chosen by the user, at the password entry screen. This picture is often derived from a server other than the one serving up the password entry component, and makes it more difficult for a malicious entity to spoof the password entry screen without failing to display (or displaying incorrect) associated images. In combination with or in addition to a security-based image, a cognitive aid image can be provided to assist in establishing a context by which a user may remember the password itself. The cognitive aid image can be sourced from a different server than the security-based image.

Embodiments can include automatically generated associative context in many forms, such as a three-dimensional virtual room or environment in which the password has been entered previously. Visual depictions as cognitive aids can be arbitrary, as there is no direct link to system security. Another example of an associative context form includes the use of a mnemonic to assist the user in remembering the password, e.g., a simulated kinesthetic mnemonic for the password.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
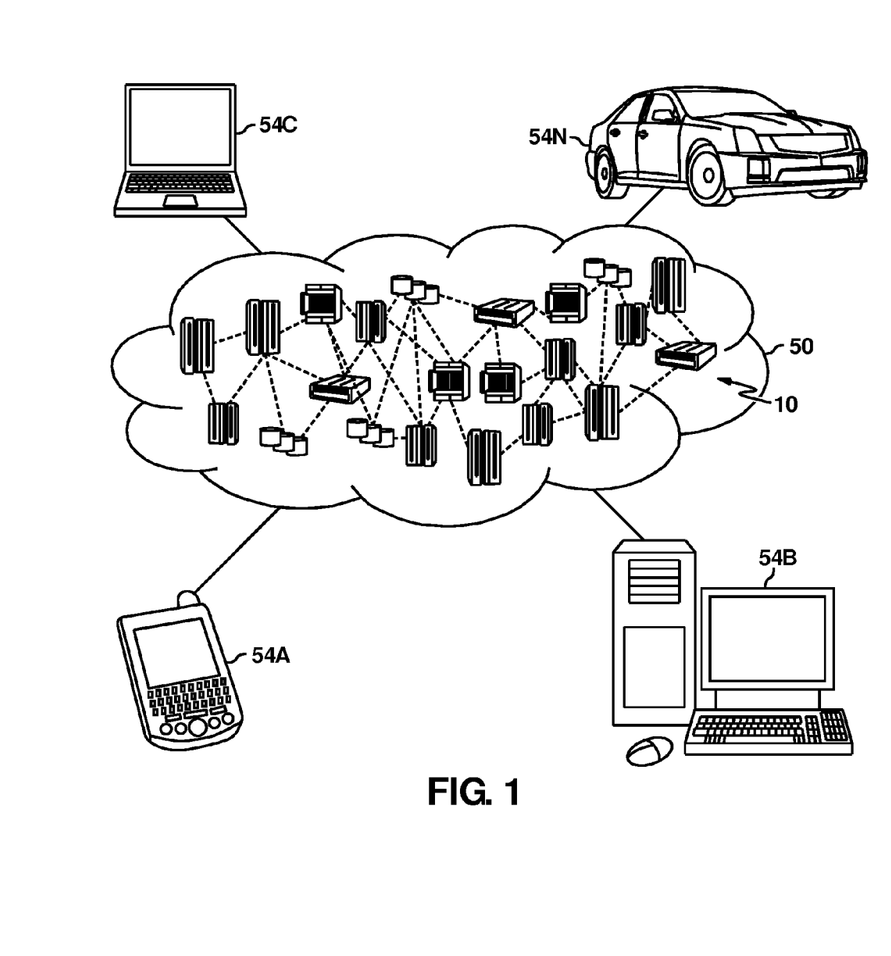
FIG. 1 depicts a cloud computing environment according to an embodiment.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
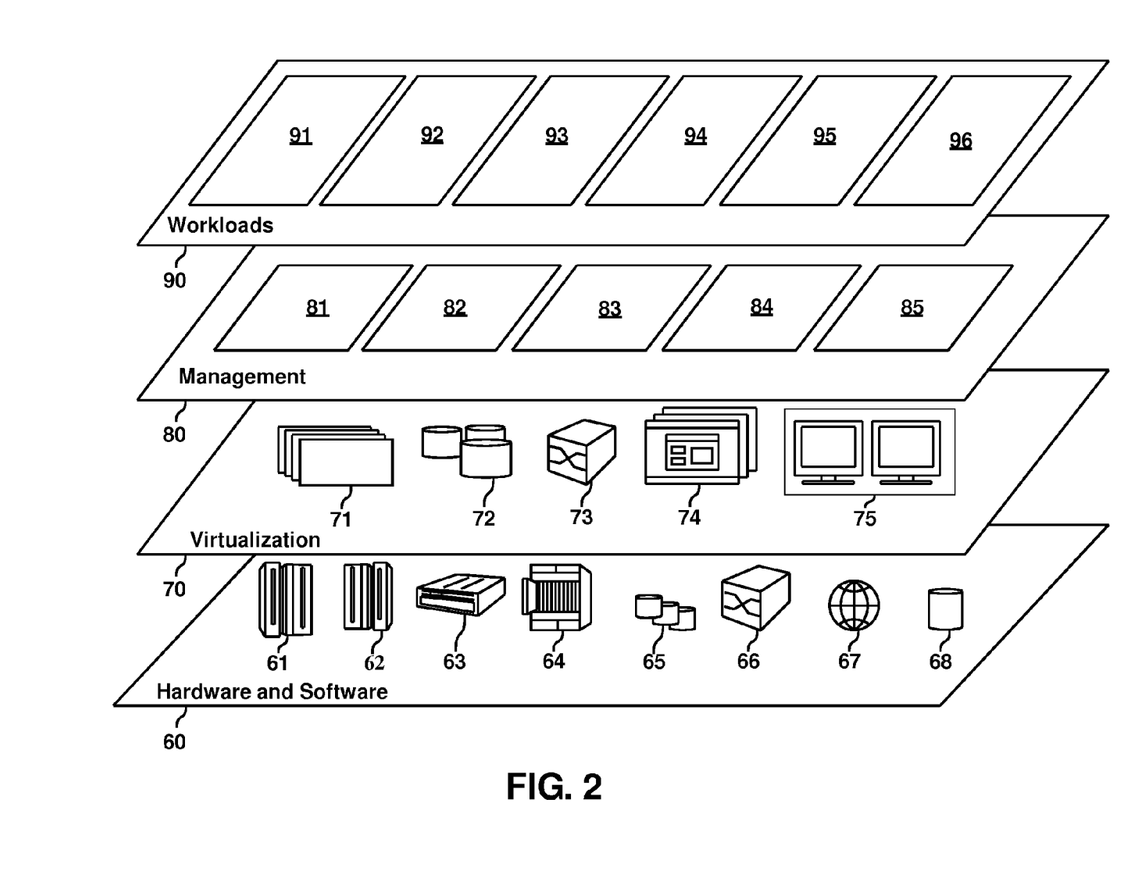
FIG. 2 depicts abstraction model layers according to an embodiment.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and various workloads 96. Although FIG. 2 depicts workloads layer 90 above management layer 80, workloads need not send I/O requests through management layer 80 to reach virtualization layer 70. In some embodiments, management layer 80 and workloads layer 90 can both directly interact with virtualization layer 70, and workloads of workloads layer 90 can operate in conjunction with or independent of management layer 80.

Figure 3:
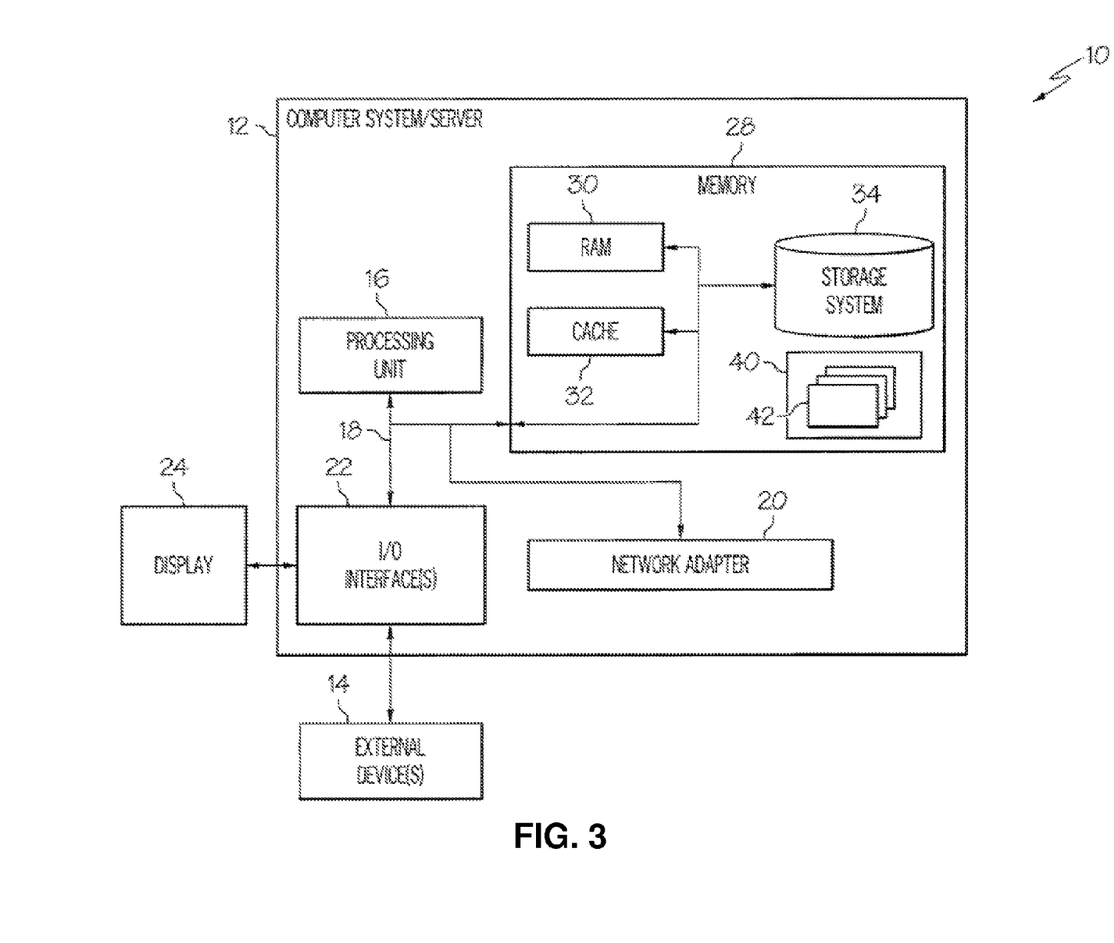
FIG. 3 depicts a block diagram of a cloud computing node according to an embodiment.

Referring now to FIG. 3, a schematic of an example of the cloud computing node 10 of FIG. 1 is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
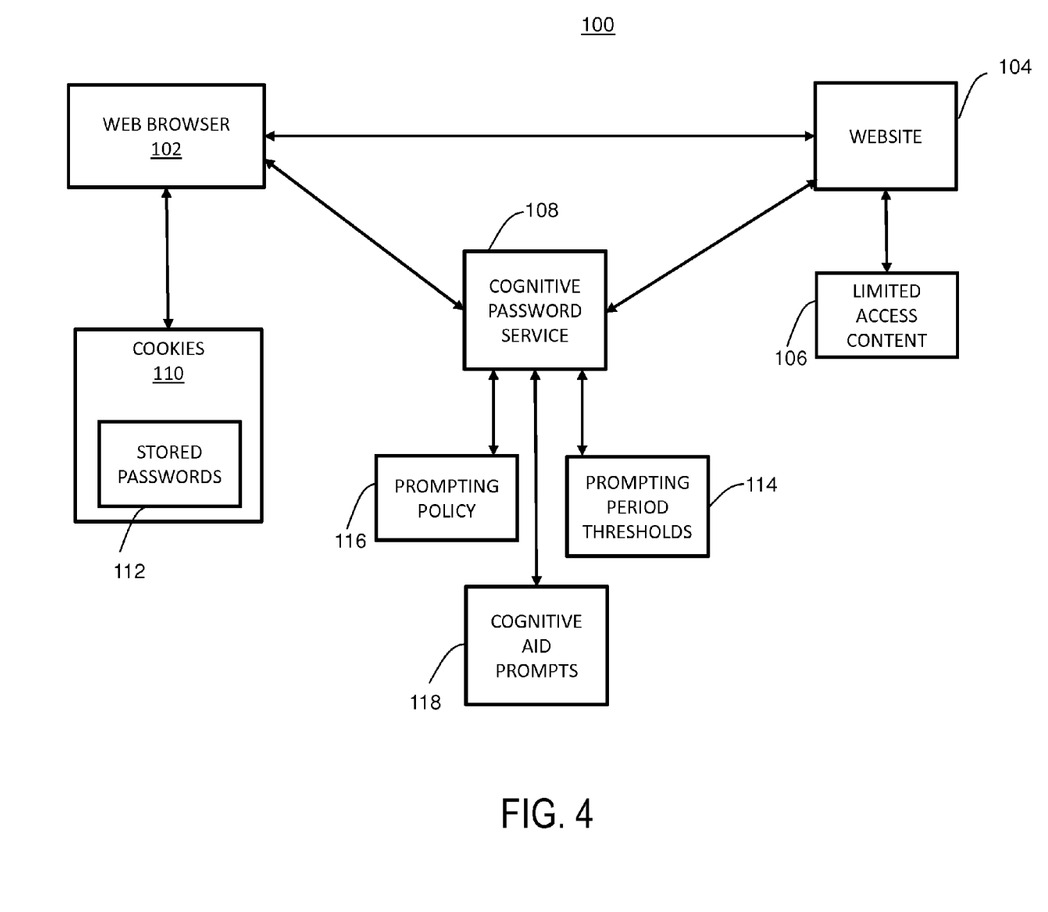
FIG. 4 depicts a block diagram of a system for cognitive password entry according to an embodiment.

Referring now to FIG. 4, a block diagram of a system 100 for cognitive password entry is depicted. A web browser 102 can execute on a computing device, such as one or the cloud computing nodes 10 of FIG. 1 and/or one of the computing devices 54A-54N of FIG. 1. The web browser 102 can communicate with a website 104, e.g., within cloud computing environment 50 of FIG. 1 or across another type of network connection, to reach limited access content 106 that requires a password to access. In embodiments a cognitive password service 108 is interposed in a password entry process between the web browser 102 and the website 104. The cognitive password service 108 can be implemented in the cloud computing environment 50 of FIG. 1, for instance, as part of the management layer 80 of FIG. 2 or may be implemented locally on a same computing device as the web browser 102 and/or website 104 or elsewhere within a networked environment.

The web browser 102 may retain stored passwords 110 in cookies 112 associated with a particular user identifier and multiple websites, including website 104. The cognitive password service 108 can detect a login attempt targeting website 104 for a user identifier having a previously stored instance of a password associated with the user identifier in the stored passwords 112. The cognitive password service 108 need not track the actual passwords but may temporarily deactivate one of the cookies 110 associated with the user identifier and the website 104 to prevent an associated password instance in the stored passwords 112 from propagating to the website 104 until/unless the cognitive password service 108 determines that a prompting period has not been reached. For instance, the cognitive password service 108 can monitor a number of login attempts since the password was manually entered at the website 104 and determine whether a prompting period has been reached based on the number of login attempts meeting a prompting period threshold. Multiple prompting period thresholds 114 can be tracked on a user identifier and website identifier basis. A prompting policy 116 can dynamically adjust the prompting period thresholds 114 with a user-specific rate of decay based on one or more of: an elapsed time since a last successful login, a level of password complexity, and a device type used to access the website 104.

A stored instance of a password can be passed from the stored passwords 112 to the website 104 via the cognitive password service 108 as an entered password for a login attempt based on determining that the prompting period has not been reached. The cognitive password service 108 can output a cognitive aid prompt selected from one or more cognitive aid prompts 118 based on determining that the prompting period has been reached.

In one embodiment, the cognitive password service 108 learns how often to provide a cognitive aid prompt to a user based on an assessment of the user. For example, user1 needs to enter the password every three times, even though user1 has requested that the web browser 102 store the password, but user2 must enter a password for the website 104 every five login times. The cognitive password service 108 may automatically determine that a user is having a problem recalling a password, and change the rate defined in the prompting period thresholds 114 for the specific user. Additionally, the cognitive password service 108 may adjust the prompting period thresholds 114 to establish a higher or lower frequency of outputting cognitive aid prompts 118 to the user based on how often the user attempts to access the website 104.

In an embodiment, the user may request that the cognitive password service 108 defer making a manual entry of the password for another time because the user is in a rush (and the password is already stored and available in the stored passwords 112). In an embodiment, the cognitive password service 108 may allow the stored instance of the password to be passed to the website 104 upon detecting a partly mistyped the password in response to a cognitive aid prompt. Since the password has been saved in the stored passwords, rather than not granting access to the website 104, the cognitive password service 108 may respond with a warning message, such as "the password you entered doesn't match your saved password." Also, when mistyped, and because the system 100 is already configured to allow a user to skip password entry altogether using the stored passwords 112, the cognitive password service 108 may coach the user on how best to remember the password. For example, the sequence may progress as follows:

1. "The password you entered does not match your saved password. Please try again."
2. "You seem to be trying similar passwords."
3. "You are getting warmer."
4. "Good. You remembered! In the future, I advise you to think about this website as the kind that accepts the second version of the password you entered."
5. "Would you like to create a cognitive associative context to be displayed whenever I ask you if you remember you password?"
6. "Please don't make the cognitive associative context an obvious depiction of your password."
7. "May I suggest the following cognitive associative context?"

In embodiments, rather than maintaining the stored passwords 112 locally on the same computing device as web browser 102, the stored passwords 112 can be stored elsewhere within the cloud computing environment 50 of FIG. 1. For example, there can be a passwords cloud, and the cognitive password service 108 can maintain a table mapping user identifiers and website identifiers to entries in the passwords cloud to store, update, and retrieve the stored passwords 112.

In embodiments, the prompting policy 116 can support user configuration of the prompting period thresholds 114 such that a user can establish a desired rate of cognitive aid prompting, for instance, using a graphical user interface such as a pulldown interface.

The prompting policy 116 may include selection controls that determine when and in what situation the cognitive aid prompts 118 are to be output. As an example, cognitive aid prompting may be enabled or disabled depending on a history of past use, a department profile in a company, a company profile, a reputation profile, a security profile, a social network, a location of use, a device being used, a class of device being used, the nature of website 104 being accessed, the nature of application being accessed for the limited access content 106, and the like. The prompting policy 116 can adjust the prompting period thresholds 114 based on factors such as a history of past use, a department profile in a company, a company profile, a reputation profile, a security profile, a social network, a location of use, a device being used, a class of device being used, the nature of website 104 being accessed, the nature of application being accessed for the limited access content 106, and the like.

Figure 5:
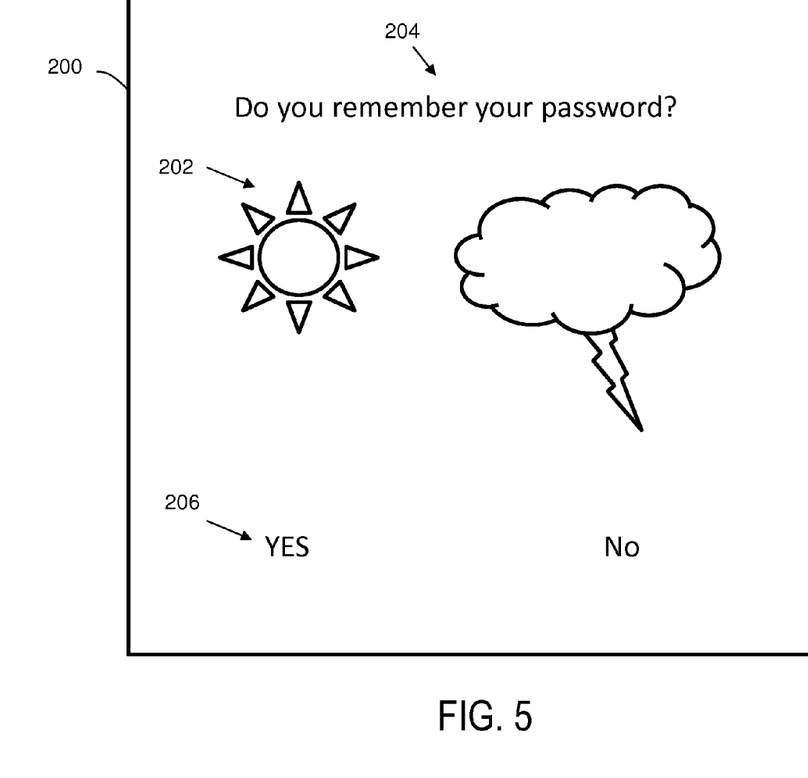
FIG. 5 depicts an example of a cognitive aid prompt according to an embodiment.

FIG. 5 depicts an example of a cognitive aid prompt 200 according to an embodiment. The example of FIG. 5 illustrates a form of associative learning that presents an associative context 202 as one or more images. The images of the associative context 202 may be user selectable or arbitrarily selected from the cognitive aid prompts 118 of FIG. 4. In an embodiment, the cognitive aid prompt 200 is output to a user interface at a predefined interval according to the prompting period thresholds 114 of FIG. 4. In the example of FIG. 5, rather than asking the user to manually re-enter the password associated with the used identifier for website 104 of FIG. 4, the cognitive aid prompt 200 includes question 204, "Do you remember your password?" The cognitive aid prompt 200 provides user options 206 (i.e., YES/NO). Based on detecting a user selection of "YES", the cognitive password service 108 of FIG. 4 can proceed with automatic password entry from the stored passwords 112 of FIG. 4 to access to the website 104 of FIG. 4. Based on detecting a user selection of "NO", the cognitive password service 108 of FIG. 4 may initiate an interactive password coaching session including a sequence of two or more password coaching tips. If the user fails to recall the password upon coaching, the password can be reset.

Figure 6:
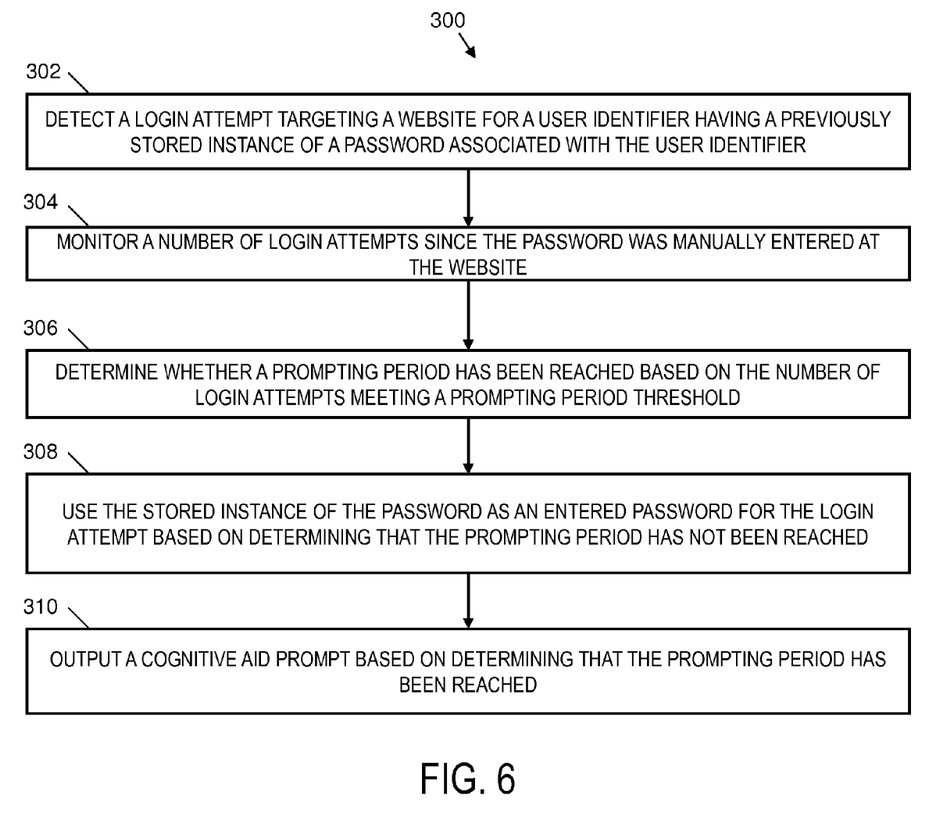
FIG. 6 depicts a process flow for cognitive password entry according to an embodiment.

Referring to FIG. 6, a process flow 300 for cognitive password entry is generally shown in accordance with an embodiment. In an embodiment, the processing shown in FIG. 6 is performed by the cognitive password service 108 of FIG. 4 executing on one or more processors, such as processor 16 of FIG. 3. The process flow 300 is further described with respect to FIGS. 1-5. When there are no saved passwords in the stored passwords 112 associated with website 104, the user can login to the website 104 and manually enter a password. The user may be presented with an option to save the password. Upon agreeing to save the password in the stored passwords 112, the cognitive password service 108 can create a record of the website 104 associated with a user identifier (which may be a machine identifier), a record that the password has been stored (or a copy of the password), a prompting period threshold, and other data as may be needed to support the prompting policy 116. User preferences for the prompting policy 116 can be set globally for the user or on a per website basis.

At block 302, a login attempt is detected by processor 16 executing the cognitive password service 108, where the login attempt targets website 104 for a user identifier having a previously stored instance of a password associated with the user identifier in the stored passwords 112. At block 304, the processor 16 can monitor a number of login attempts since the password was manually entered at the website 104.

At block 306, the processor 16 can determine whether a prompting period has been reached based on the number of login attempts meeting a prompting period threshold from the prompting period thresholds 114. At block 308, the stored instance of the password is used as an entered password for the login attempt based on determining that the prompting period has not been reached. For instance, the cognitive password service 108 can directly send or enable the web browser 102 to send a stored password to autocomplete a password field on the website 104. The cognitive password service 108 can increment a prompting counter with each access.

At block 310, a cognitive aid prompt from cognitive aid prompts 118 is output based on determining that the prompting period has been reached. Outputting can include sending the cognitive aid prompt from the cognitive password service 108 to the web browser 102 for display. The outputting of the cognitive aid prompt can be user enabled. The cognitive aid prompt can be a request to manually enter the password. Alternatively, the cognitive aid prompt can be an associative context. The stored instance of the password can be used as the entered password for the login attempt based on receiving an indication that the user remembers the password in response to the cognitive aid prompt or based on detecting a partial match between the stored instance of the password and a manual entry received in response to the cognitive aid prompt.

An interactive password coaching session that includes a sequence of two or more password coaching tips can be initiated based on determining that the stored instance of the password and a manual entry received in response to the cognitive aid prompt do not match. Alternatively, the user can be presented with an error message but allowed access to the website 104 using the stored instance of the password.

The prompting period may be user configurable by allowing specific user-defined values to be set in the prompting period thresholds 114. The prompting period threshold can be dynamically adjusted according to the prompting policy 116 based on one or more of: an elapsed time since a last successful login, a likelihood of logging into the website 104 from multiple computers, a level of password complexity, and a device type used to access the website. The prompting policy 116 can establish and adjust a user-specific rate of decay of the prompting period threshold. The likelihood of logging into the website 104 from multiple computers can be determined based on a designation of the website 104 (e.g., a "mobile" site designation), a history of multiple devices associated with the user, a history of other users accessing the website 104 from multiple devices, and/or other factors. The level of password complexity can include the number of password formation rules met by the password, such as a capital letter, a symbol, a letter, a number, etc. A higher degree of password complexity can result in lowering the prompting threshold, as the user will likely benefit from more frequent reminders. The device type may be used to enable/disable outputting of the cognitive aid prompts 118. For instance, when access occurs through a mobile phone, output of the cognitive aid prompts 118 can be blocked.

One example of a response to the cognitive aid prompt is a deferral request. The stored instance of the password can be used as the entered password in response to the deferral request. The prompting period may be reset based on the deferral request.

Figure 7:
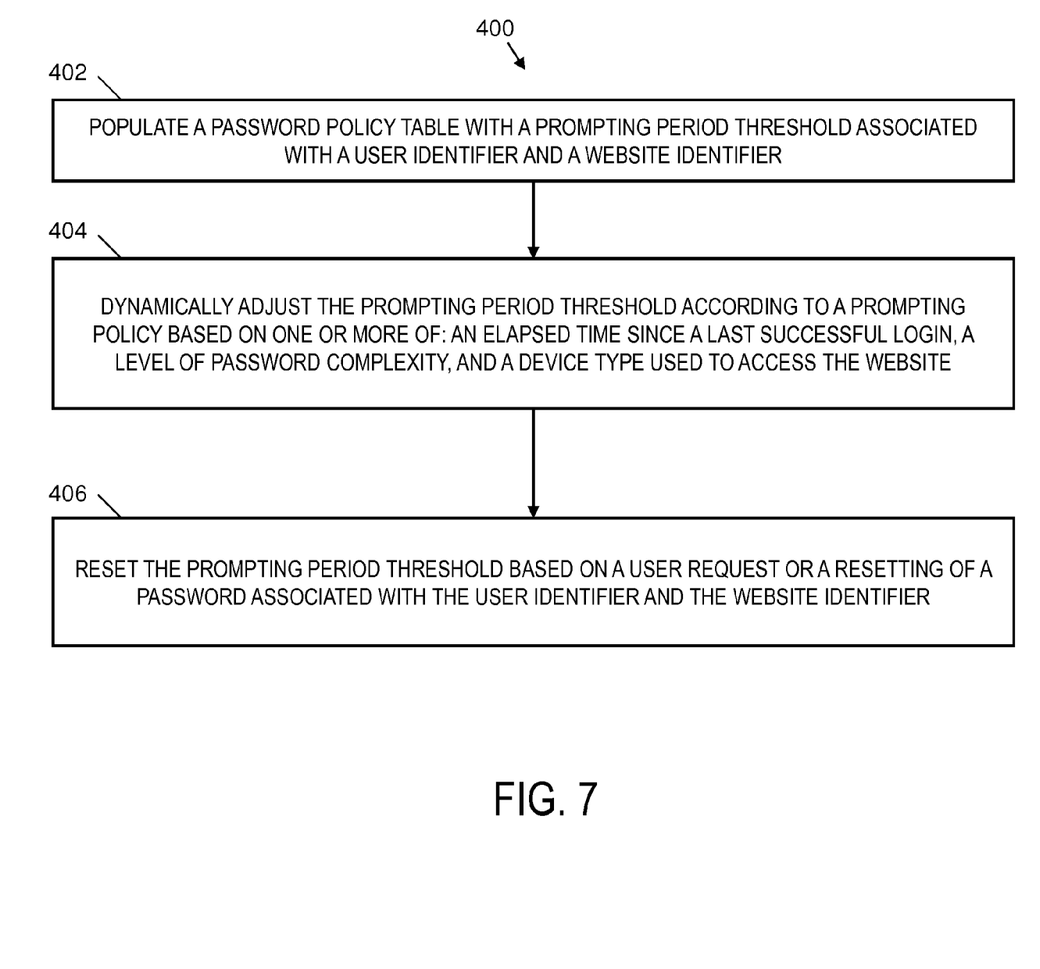
FIG. 7 depicts a process flow for adjusting a prompting period threshold according to an embodiment.

FIG. 7 depicts a process flow 400 for adjusting a prompting period threshold according to an embodiment. At block 402, a prompting policy table can be populated with a prompting period threshold associated with a user identifier and a website identifier. At block 404, the prompting period threshold can be dynamically adjusted according to the prompting policy 116 of FIG. 4 based on one or more of: an elapsed time since a last successful login, a level of password complexity, and a device type used to access the website. At block 406, the prompting period threshold can be reset based on a user request or a resetting of a password associated with the user identifier and the website identifier.

Technical effects and benefits include a cognitive password entry system that assists in password recall and reduces security risks that may arise in frequent password resets due to users forgetting previously stored passwords.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A computer-implemented method for cognitive password entry, the method comprising:
    detecting, by a processor, a login attempt targeting a website for a user identifier having a previously stored instance of a password associated with the user identifier;
    monitoring a number of login attempts using the stored instance of the password to auto-complete a password field on the website;
    determining whether a prompting period has been reached based on the number of login attempts meeting a prompting period threshold;
    activating access to a cookie associated with the user identifier to propagate the previously stored instance of the password to the website based on determining that the prompting period has not been reached;
    using the stored instance of the password as an entered password for the login attempt based on determining that the prompting period has not been reached;
    temporarily deactivating access to the cookie associated with the user identifier to prevent the previously stored instance of the password from propagating to the website based on determining that the prompting period has been reached;
    outputting a cognitive aid prompt based on determining that the prompting period has been reached, the cognitive aid prompt comprising a context to assist a user in remembering the password associated with the user identifier;
    using the stored instance of the password as the entered password for the login attempt based on receiving an indication that a user remembers the password in response to the cognitive aid prompt or based on detecting a partial match between the stored instance of the password and an entry received in response to the cognitive aid prompt; and
    reactivating access to the cookie associated with the user identifier responsive to a successful login after outputting the cognitive aid prompt.

2. The computer-implemented method of claim 1, wherein the outputting of the cognitive aid prompt is user enabled.

3. The computer-implemented method of claim 1, wherein the cognitive aid prompt comprises a request to enter the password.

4. The computer-implemented method of claim 1, wherein the cognitive aid prompt comprises an associative context.

5. The computer-implemented method of claim 1, further comprising:
    initiating an interactive password coaching session comprising a sequence of two or more password coaching tips based on determining that the stored instance of the password and an entry received in response to the cognitive aid prompt do not match.

6. The computer-implemented method of claim 1, wherein the prompting period is user configurable.

7. The computer-implemented method of claim 1, wherein the prompting period threshold is dynamically adjusted according to a prompting policy based on one or more of: an elapsed time since a last successful login, a level of password complexity, and a device type used to access the website.

8. The computer-implemented method of claim 7, wherein the prompting policy establishes and adjusts a user-specific rate of decay of the prompting period threshold.

9. The computer-implemented method of claim 1, further comprising:
    receiving a deferral request in response to the cognitive aid prompt;
    using the stored instance of the password as the entered password in response to the deferral request; and
    resetting the prompting period based on the deferral request.

* * * * *